US012691763B2

(12) United States Patent
Lidström et al.

(10) Patent No.: US 12,691,763 B2
(45) Date of Patent: Jul. 28, 2026

(54) METHOD FOR CONTROLLING PREVENTION OF DISCONNECTING A BATTERY PACK IN AN ENERGY STORAGE SYSTEM OF A VEHICLE

(71) Applicant: VOLVO TRUCK CORPORATION, Gothenburg (SE)

(72) Inventors: Emil Lidström, Torslanda (SE); Dripta Ray, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/971,799

(22) Filed: Dec. 6, 2024

(65) Prior Publication Data

US 2025/0196648 A1     Jun. 19, 2025

(30) Foreign Application Priority Data

Dec. 14, 2023     (EP) ..................................... 23216714

(51) Int. Cl.
*B60L 3/00*          (2019.01)
*B60L 53/62*        (2019.01)

(52) U.S. Cl.
CPC ............. *B60L 3/0046* (2013.01); *B60L 53/62* (2019.02)

(58) Field of Classification Search
None
See application file for complete search history.

(56) References Cited

U.S. PATENT DOCUMENTS

| | | | | |
|---|---|---|---|---|
| 6,049,143 A | * | 4/2000 | Simpson ............ | H01R 13/7039 307/131 |
| 8,598,840 B2 | | 12/2013 | Yount et al. | |

| | | | | |
|---|---|---|---|---|
| 9,776,529 B2 | | 10/2017 | Jestin et al. | |
| 10,421,367 B2 | | 9/2019 | Alser et al. | |
| 10,903,532 B2 | | 1/2021 | Mi et al. | |
| 2006/0232229 A1 | * | 10/2006 | Heckmann ......... | H05B 41/2855 315/309 |
| 2011/0089953 A1 | * | 4/2011 | Chandler ............. | G01R 31/396 324/427 |
| 2017/0120771 A1 | * | 5/2017 | Alser ................. | G01R 31/3644 |
| 2018/0186241 A1 | * | 7/2018 | Harvey ................. | B60L 53/14 |
| 2022/0169146 A1 | * | 6/2022 | Lohe ..................... | H02J 7/0047 |
| 2024/0348074 A1 | * | 10/2024 | Kelkka ................. | H02J 7/0063 |

FOREIGN PATENT DOCUMENTS

DE      102018222450 A1      6/2020

OTHER PUBLICATIONS

Extended European Search Report in corresponding European Application No. 23216714.8 dated Jun. 10, 2024 (8 pages).

* cited by examiner

*Primary Examiner* — Menatoallah Youssef
*Assistant Examiner* — Joel Barnett
(74) *Attorney, Agent, or Firm* — Jeffri A. Kaminski; Venable LLP

(57)          ABSTRACT

A computer system is configured to identify a fault or error from a voltage measurement in a first battery pack of an energy storage system at a first point in time and during a first time interval; identify a corresponding fault or error from a voltage measurement in a second battery pack of the energy storage system at a second point in time and during the first time interval, the second point in time being subsequent to the first point in time; in response of identifying the corresponding faults or errors of the voltage measurements in the first and second battery packs during the first time interval, prevent disconnection of at least the second battery pack.

19 Claims, 5 Drawing Sheets

METHOD FOR CONTROLLING PREVENTION OF DISCONNECTING A BATTERY PACK IN AN ENERGY STORAGE SYSTEM OF A VEHICLE

TECHNICAL FIELD

The disclosure relates generally to operating management of an energy storage system of a vehicle. In particular aspects, the disclosure relates to a method for controlling prevention of disconnecting a battery pack in an energy storage system of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A vehicle typically comprises an engine for propelling the vehicle. The engine may be powered by various means, such as e.g. by liquid or gaseous fuel in a combustion engine or an internal combustion engine, or by electric power in an electric machine. Moreover, hybrid solutions exist in which the vehicle is propelled both by an internal combustion engine and an electric machine. In either way, an energy storage device is used to store the energy needed in order to propel the vehicle. Energy storage devices may further be used to power auxiliary loads in the vehicle.

For many vehicles, the energy storage devices are comprised in an energy storage system, wherein the energy storage system is configured to power the electric machine for propelling the vehicle, as well as any auxiliary load. For example, for an electric vehicle, the energy storage devices may be batteries or battery packs, which are configured to operate the electric machine as well as electrically driven auxiliary equipment. The electric machine and/or the electrically driven auxiliary equipment may be commonly referred to as a load. Several batteries, or several series-connected and/or parallel connected battery cells, may be grouped into the battery pack. The battery pack is periodically in need of charging, and is then electrically connected to an electrical energy source, e.g. via plug directly connected to the power grid, or by an on-board charger. Such chargers may commonly be referred to as a power source.

In many applications, several battery packs are included in the energy storage system by being parallelly connected to a common traction voltage bus (or common traction power bus), sometimes referred to as multi-battery pack system. The load and/or power source is also connected to the common traction voltage bus. Hereby, the supplied power can be adapted based on the number of battery packs, and/or higher power requirements of the vehicle may be met. Moreover, a multi-battery pack system provide a redundancy, as several battery packs may supply power individually. Typically, each battery pack is associated with a switch, or contactor, enabling connection and disconnection of the battery pack relative the common traction voltage bus and the load and/or power source. However, in case of an identified or detected fault or error in a battery pack, the battery pack may have to be disconnected from the energy storage system or at least of the common traction voltage bus. The disconnection of a battery pack lead to a worsened availability of the energy storage system. In case the fault or error is mis-triggered, an unnecessary and undesirable disconnection of a battery pack is made.

SUMMARY

According to a first aspect of the disclosure, a computer system comprising processing circuitry is provided. The processing circuitry is configured to: identify a fault or error from a voltage measurement in a first battery pack of an energy storage system at a first point in time and during a first time interval; identify a corresponding fault or error from a voltage measurement in a second battery pack of the energy storage system at a second point in time and during the first time interval, the second point in time being subsequent to the first point in time; in response of identifying the corresponding faults or errors of the voltage measurements in the first and second battery packs during the first time interval, prevent disconnection of at least the second battery pack. The first aspect of the disclosure may seek to overcome problems related to undesirable and unnecessary disconnections of at least the second battery pack. That is, by preventing disconnection of at least the second battery pack in response to identifying the corresponding faults or errors of the voltage measurements in the first and second battery packs during the first time interval, at least the second battery pack can remain connected, as an identification of corresponding faults or errors of the voltage measurements in the first and second battery packs during the first time interval is assumed to be originating from mis-triggered, or mis-interpretated, faults or errors, and not from authentic faults or errors in the first and second battery packs. A technical benefit may include improved availability of the energy storage system. Corresponding faults or errors of the voltage measurements in the first and second battery packs may e.g. be faults or errors of the same type, or faults or errors being similar or the same. For example, in response of identifying the same fault or error of the voltage measurements in the first and second battery packs during the first time interval, disconnection of at least the second battery pack may be prevented by the processing circuitry. The first battery pack may be series-connected, or parallelly connected, to the second battery pack. Each one of the first and second battery packs typically comprises a plurality of series-connected battery cells. The plurality of battery cells may be clustered into battery modules, e.g. comprises a plurality of parallelly connected battery cells, wherein each battery pack comprises a plurality of series-connected battery modules. Thus, the voltage measurement in the first battery pack may correspond to a voltage measurement of a battery cell, of a group of battery cells, e.g. a battery module, or of the first battery pack itself. Correspondingly, the voltage measurement in the second battery pack may correspond to a voltage measurement of a battery cell, of a group of battery cells, e.g. a battery module, or of the second battery pack itself. Each one of the first and second battery pack may be connectable to a common traction voltage bus of the energy storage system by means of contactors. The common traction voltage bus is typically electrically connected to a load, e.g. an electric traction machine, or a power source, e.g. a charger. Thus, a connected battery pack may be referred to as a battery pack in which the associated contactor is closed and the battery pack is electrically connected to the common traction voltage bus, e.g. for powering the load, and a disconnected battery pack may be referred to as a battery pack in which the associated contactor is opened and the battery pack is electrically disconnected from the common traction voltage bus, and thus unable to power the load. Preventing disconnection of a battery pack may thus refer to the action of preventing the associated contactor to open, and thereby preventing disconnection of the battery pack from the common traction voltage bus. Thus, for a scenario in which the first and second battery packs are connectable to the common traction voltage bus, the processing circuitry is configured to prevent disconnection of the second battery pack by preventing the associated contactor to open in response of identifying the corresponding faults or errors of the voltage measurements in the first and second battery packs during the first time interval. However, it should be mentioned that a disconnected battery pack may be defined as a battery pack that is disconnected from the energy storage system, e.g. by activating a fuse in the battery pack, electrically isolating the battery pack from the other components in the energy storage system.

Optionally in some examples, including in at least one preferred example, the processing circuitry is configured to interpret corresponding faults or errors of the voltage measurements in the first and second battery packs during the first time interval as belonging to a predefined group of non-authentic faults or errors. That is, such corresponding faults or errors are identified as mis-triggered, or mis-interpreted, faults or errors. The predefined group of non-authentic faults or errors may e.g. be comprised in a look-up table, comprised in, or available to, the processing circuitry.

Optionally in some examples, including in at least one preferred example, the processing circuitry is further configured to: in response of identifying the corresponding faults or errors of the voltage measurements in the first and second battery packs during the first time interval, prevent disconnection of the first battery pack. A technical benefit may include improved availability of the energy storage system. That is, by preventing disconnection of also the first battery pack in response to identifying corresponding faults or errors of the voltage measurements in the first and second battery packs during the first time interval (i.e. the same faults or errors identified for preventing disconnection of the second battery pack), the first battery pack can remain connected. Thus, in case the first battery pack hasn't yet been disconnected, e.g. due to an insufficient time subsequent to the identified fault or error of the voltage measurement in the first battery pack for the processing circuitry to manage such disconnection, the first battery pack may be prevented to be disconnected in response of identifying the corresponding faults or errors of the voltage measurements in the first and second battery packs during the first time interval. However, according to some examples, the processing circuitry is configured to disconnect the first battery pack, such as immediately disconnect the first battery pack, in response of identifying the fault or error from the voltage measurement in the first battery pack. Thus, the first battery pack may already be disconnected when the processing circuitry identifies the corresponding fault or error from the voltage measurement in the second battery pack.

Optionally in some examples, including in at least one preferred example, the processing circuitry is further configured to: in response of identifying the fault or error of the voltage measurement in the first battery pack, prevent disconnection of the first battery pack at least during the first time interval. A technical benefit may include improved availability of the energy storage system. Thus, by implementing a lag for disconnecting the first battery pack in response of identifying the fault or error of the voltage measurement in the first battery pack at the first point in time, the lag being set to be at least that of the first time interval, disconnection of the first battery pack may be prolonged in order to assess whether or not a corresponding fault or error will be identified for the voltage measurement in the second battery pack during the first time interval. If such corresponding fault or error is identified for the voltage measurement in the second battery pack during the first time interval, a likely unnecessary disconnection of the first battery pack has been avoided.

Optionally in some examples, including in at least one preferred example, the first time interval is shorter than 10 s, or shorter than 5 s. A technical benefit may include a suitable time interval for balancing the risk of battery pack failure with the risk of triggering unnecessary battery pack disconnections. The first time interval is e.g. between 0, or 0.1 s, and 5 s or 10 s. The first point in time is typically included in the first time interval, and the first time interval may extend, in time, from the first point in time (including the first point in time) and for a subsequent 5 s or 10 s.

Optionally in some examples, including in at least one preferred example, wherein the corresponding faults or errors from the voltage measurements in the first and second battery packs are sensor faults or sensor errors from corresponding voltage or current sensors in the first and second battery packs. A technical benefit may include identification of a common type of fault or error leading to unnecessary disconnection of battery packs. It should be understood that a current sensor is typically configured to measure the voltage of the battery cell, battery module or battery pack, in addition to measuring the current. Such current sensor may be referred to as a combined voltage and current sensor. The identified sensor fault or sensor error may e.g. originate from parameter variations due to electrical noise or quick parameter variations in the current output of the corresponding battery pack.

Optionally in some examples, including in at least one preferred example, the processing circuitry is further configured to: prevent disconnection of the second battery pack by transmitting data with instruction to a control unit for the second battery pack to block disconnection of the second battery pack. A technical benefit may include an efficient way of preventing disconnection of the second battery pack. For example, the processing circuitry may be configured to use the identified faults or errors as input data, and to transmit the decision to disconnect the battery packs in response to the identified faults or errors as output data. Thus, in case the first and/or second battery pack is to be prevented from being disconnected, as previously described, the processing circuitry may simply be configured to omit transmitting the decision to disconnect the first and/or second battery pack. According to another example, the processing circuitry may be configured to transmit the identified fault or error of the voltage measurement in the first battery pack over a CAN data bus connected to the second battery pack, wherein the second battery pack is made aware of the identified fault or error of the voltage measurement in the first battery pack, and may adapt its diagnostic actions accordingly (i.e. prevent disconnection in case a corresponding fault or error is identified in the voltage measurement in the second battery pack during the first time interval, as previously described).

Optionally in some examples, including in at least one preferred example, the corresponding faults or errors from the voltage measurements in the first and second battery packs are indicative of a disconnection of the first and second battery packs, respectively. A technical benefit may include efficient implementation of the prevention of disconnecting at least the second battery pack. Thus, the processing circuitry may be configured to identify the fault or error from the voltage measurement in the first battery pack as belonging to a predefined group of faults or errors which are indicative of disconnecting the first battery pack. That is, in response of identifying such faults or errors, the processing circuitry may be configured to disconnect the first battery pack, e.g. by transmitting a signal to a contactor of the first battery pack to open, or to trigger a fuse in the first battery pack. Correspondingly, the processing circuitry may be configured to identify the fault or error from the voltage measurement in the second battery pack as belonging to the predefined group of faults or errors which are indicative of disconnecting the second battery pack. That is, in response of identifying such faults or errors, the processing circuitry may be configured to disconnect the second battery pack, e.g. by transmitting a signal to a contactor of the second battery pack to open, or to trigger a fuse in the second battery pack. The predefined group of faults or errors which are indicative of disconnecting the first and second battery packs may e.g. be comprised in a look-up table, comprised in, or available to, the processing circuitry.

Optionally in some examples, including in at least one preferred example, the processing circuitry is configured to identify the fault or error from the voltage measurement in the first battery pack by receiving sensor data from a voltage or current sensor in the first battery pack, the sensor data including data of the fault or error, and to identify the fault or error from the voltage measurement in the second battery pack by receiving sensor data from a voltage or current sensor in the second battery pack, the sensor data including data of the fault or error. A technical benefit may include efficient and reliable handling of data related to the fault or error. Thus, the sensor data of the voltage measurement in the first battery pack may be compared to the sensor data of the voltage measurement in the second battery pack, and corresponding faults or errors of the voltage measurements in the first and second battery packs can be identified by the compared sensor data.

Optionally in some examples, including in at least one preferred example, the processing circuitry is configured to identify the fault or error from the voltage measurement in the first battery pack by identifying a lack of expected sensor data from a voltage or current sensor in the first battery pack, and to identify the fault or error from the voltage measurement in the second battery pack by identifying a lack of expected sensor data from a voltage or current sensor in the second battery pack. A technical benefit may include a versatile identification of corresponding faults or errors of the voltage measurements in the first and second battery packs. Thus, by identifying or acknowledging no sensor data of the voltage measurement in the first battery pack and identifying or acknowledging no sensor data of the voltage measurement in the second battery pack, when sensor data is expected to be received by the processing circuitry, it may be interpreted by the processing circuitry as corresponding faults or errors of the voltage measurements in the first and second battery packs.

Optionally in some examples, including in at least one preferred example, the processing circuitry is configured to identify the fault or error from the voltage measurement in the first battery pack by identifying a voltage measurement outside of an expected voltage measurement, and to identify the fault or error from the voltage measurement in the second battery pack by identifying a voltage measurement outside of an expected voltage measurement. A technical benefit may include a versatile identification of corresponding faults or errors of the voltage measurements in the first and second battery packs. For example, the identified voltage measurement outside of the expected voltage measurement may be the result of fluctuating voltage measurements within the expected measurement range, or abrupt fluctuation leading to out of measurement range.

Optionally in some examples, including in at least one preferred example, the processing circuitry is comprised in the battery management system for the first battery pack and/or the second battery pack. Alternatively, the processing circuitry may be comprised in a central control unit, central ECU, of the vehicle, the central control unit being a battery management system for both the first battery pack and the second battery pack.

According to a second aspect of the disclosure, a vehicle comprising the computer system of the first aspect of the disclosure is provided. The second aspect of the disclosure may seek to solve the same problem as described for the first aspect of the disclosure. Thus, effects and features of the second aspect of the disclosure are largely analogous to those described above in connection with the first aspect of the disclosure.

Optionally in some examples, including in at least one preferred example, the vehicle further comprises a first voltage or current sensor arranged in the first battery pack of the energy storage system, the first voltage or current sensor being arranged to measure a voltage in the first battery pack and to send sensor data of the voltage measurement to the processing circuitry of the computer system, and a second voltage sensor arranged in the second battery pack of the energy storage system, the second voltage sensor being arranged to measure a voltage in the second battery pack and to send sensor data of the voltage measurement to the processing circuitry of the computer system. Thus, analogous to that described with reference to the first aspect of the disclosure, the first voltage or current sensor may be arranged to measure the voltage of a battery cell in the first battery pack, of a group of battery cells, e.g. a battery module, in the first battery pack or of the first battery pack itself. Correspondingly, the second voltage or current sensor may be arranged to measure the voltage of a battery cell in the second battery pack, of a group of battery cells, e.g. a battery module, of the second battery pack or of the second battery pack itself.

According to a third aspect of the disclosure, a computer-implemented method is provided. The method comprises: identifying, by a processing circuitry of a computer system, a fault or error from a voltage measurement in a first battery pack of an energy storage system at a first point in time and during a first time interval; identifying, by the processing circuitry, a corresponding fault or error from a voltage measurement in a second battery pack of the energy storage system at a second point in time and during the first time interval, the second point in time being subsequent to the first point in time; preventing, by the processing circuitry, disconnection of at least the second battery pack in response of identifying the corresponding faults or errors of the voltage measurements in the first and second battery packs during the first time interval. The third aspect of the disclosure may seek to solve the same problem as described for the first aspect of the disclosure. Thus, effects and features of the third aspect of the disclosure are largely analogous to those described above in connection with the first aspect of the disclosure, and are not repeated here again. The processing circuitry is e.g. that of the first aspect of the disclosure.

Optionally in some examples, including in at least one preferred example, the method further comprises: preventing, by the processing circuitry, disconnection of the first battery pack in response of identifying the corresponding faults or errors of the voltage measurements in the first and second battery packs during the first time interval.

Optionally in some examples, including in at least one preferred example, the method further comprises: preventing, by the processing circuitry, disconnection of the first battery pack at least during the first time interval in response of identifying the fault or error of the voltage measurement in the first battery pack.

Optionally in some examples, including in at least one preferred example, the first time interval is shorter than 10 s, or shorter than 5 s.

Optionally in some examples, including in at least one preferred example, the method further comprises: preventing disconnection of the second battery pack by transmitting, by the processing circuitry, data with instruction to a control unit for the second battery pack to block disconnection of the second battery pack.

Optionally in some examples, including in at least one preferred example, the method further comprises: identifying the fault or error from the voltage measurement in the first battery pack by receiving, by the processing circuitry, sensor data from a voltage or current sensor in the first battery pack, the sensor data including the fault or error data; and identifying the fault or error from the voltage measurement in the second battery pack by receiving, by the processing circuitry, sensor data from a voltage or current sensor in the second battery pack, the sensor data including the fault or error data.

Optionally in some examples, including in at least one preferred example, the method further comprises: identifying the fault or error from the voltage measurement in the first battery pack by identifying, by the processing circuitry, a lack of expected sensor data from a voltage sensor in the first battery pack; and identifying the fault or error from the voltage measurement in the second battery pack by identifying, by the processing circuitry, a lack of expected sensor data from a voltage sensor in the second battery pack.

According to a fourth aspect of the disclosure, a computer program product comprising program code for performing, when executed by the processing circuitry, the method of the third aspect of the disclosure is provided. The processing circuitry is e.g. that of the first aspect of the disclosure.

According to a fifth aspect of the disclosure, non-transitory computer-readable storage medium comprising instructions, which when executed by the processing circuitry, cause the processing circuitry to perform the method of the third aspect of the disclosure is provided. The processing circuitry is e.g. that of the first aspect of the disclosure.

The fourth to fifth aspects of the disclosure may seek to solve the same problem as described for the first aspect of the disclosure. Thus, effects and features of the fourth to fifth aspects of the disclosure are largely analogous to those described above in connection with the first aspect of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

The disclosed technology may solve the problem relating to undesirable and unnecessary disconnections of a battery pack. For example, a voltage sensor measuring the voltage in the battery pack may be used to evaluate whether or not a battery cell is overcharging. Due to the safety reasons, diagnostics of the battery pack may be implemented in order to find faults in the voltage measurements ("voltage sensing") and means to stop the battery pack from being used in response to an inaccurate/faulty voltage measurement by disconnecting it. However, such diagnostics may mis-trigger depending on the usage of the battery pack, e.g. due to that the measured voltage varies rapidly due to a rapidly changing current. The disclosed technology prevents disconnection of at least the second battery pack in response to identifying corresponding faults or errors of the voltage measurements in the first and second battery packs during the first time interval, and therefore the second battery pack can remain connected. That is, an identification of corresponding faults or errors of the voltage measurements in the first and second battery packs during the first time interval is assumed to be originating from mis-triggered, or mis-interpretated, faults or errors, and not from authentic faults or errors in the first and second battery packs. A technical benefit may include improved availability of the energy storage system.

Figure 1:
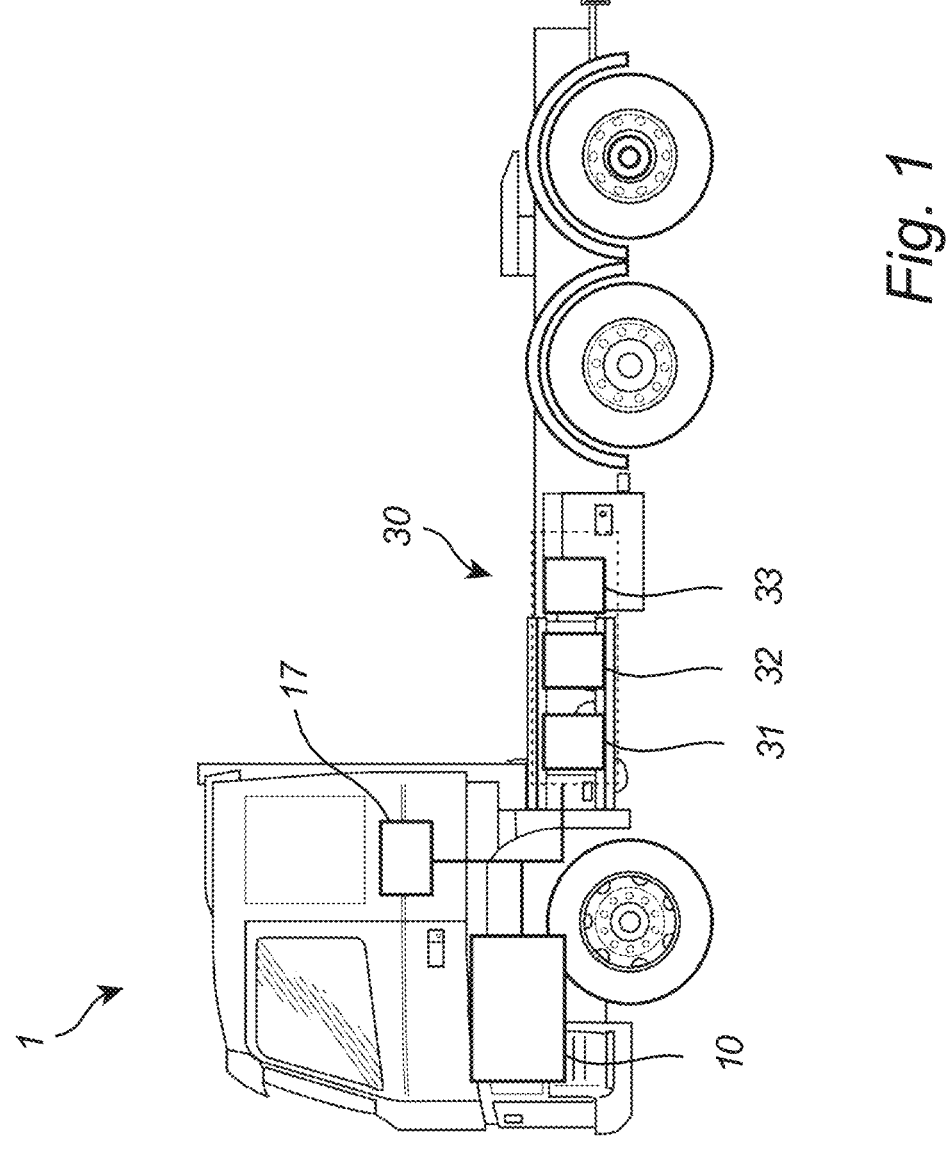
FIG. 1 is an exemplary, partly schematic, side view of an electric vehicle comprising an energy storage system having a plurality of parallelly arranged battery packs, and a computer system according to one example.

FIG. 1 shows a vehicle 1 in the form of an exemplary heavy duty truck. The vehicle 1 is an electric vehicle, such as a full electric vehicle or a hybrid, comprising at least one electric machine 10 (as an electric traction machine) powered by an energy storage system 30, wherein in the example of FIG. 1, the energy storage system 30 comprises three parallelly connected battery packs 31, 32, 33. The battery packs 31, 32, 33 are configured to power at least one load, such as the electric machine 10. The vehicle 1 further comprises associated contactor for each battery pack 31, 32, 33 (exemplified in FIG. 2), the contactors being configured to connect and disconnect the battery packs 31, 32, 33 by closing and opening, respectively. The contactors may be comprised in a switching arrangement. Moreover, the vehicle 1 comprises a computer system 17 (comprising, or being comprised in, a control unit) arranged and configured for controlling at least parts of the operation of the energy storage system 30, such as the opening and closing of the contactors. The vehicle 1 typically further comprises other parts of the powertrain such as transmission, drive shafts and wheels (not shown in detail). The electric machine 10 may be operated as an electric motor consuming electricity provided by the battery packs 31, 32, 33, e.g. to provide propulsion power, and may be operated as a generator to generate electricity to charge the battery packs 31, 32, 33.

Figure 2:
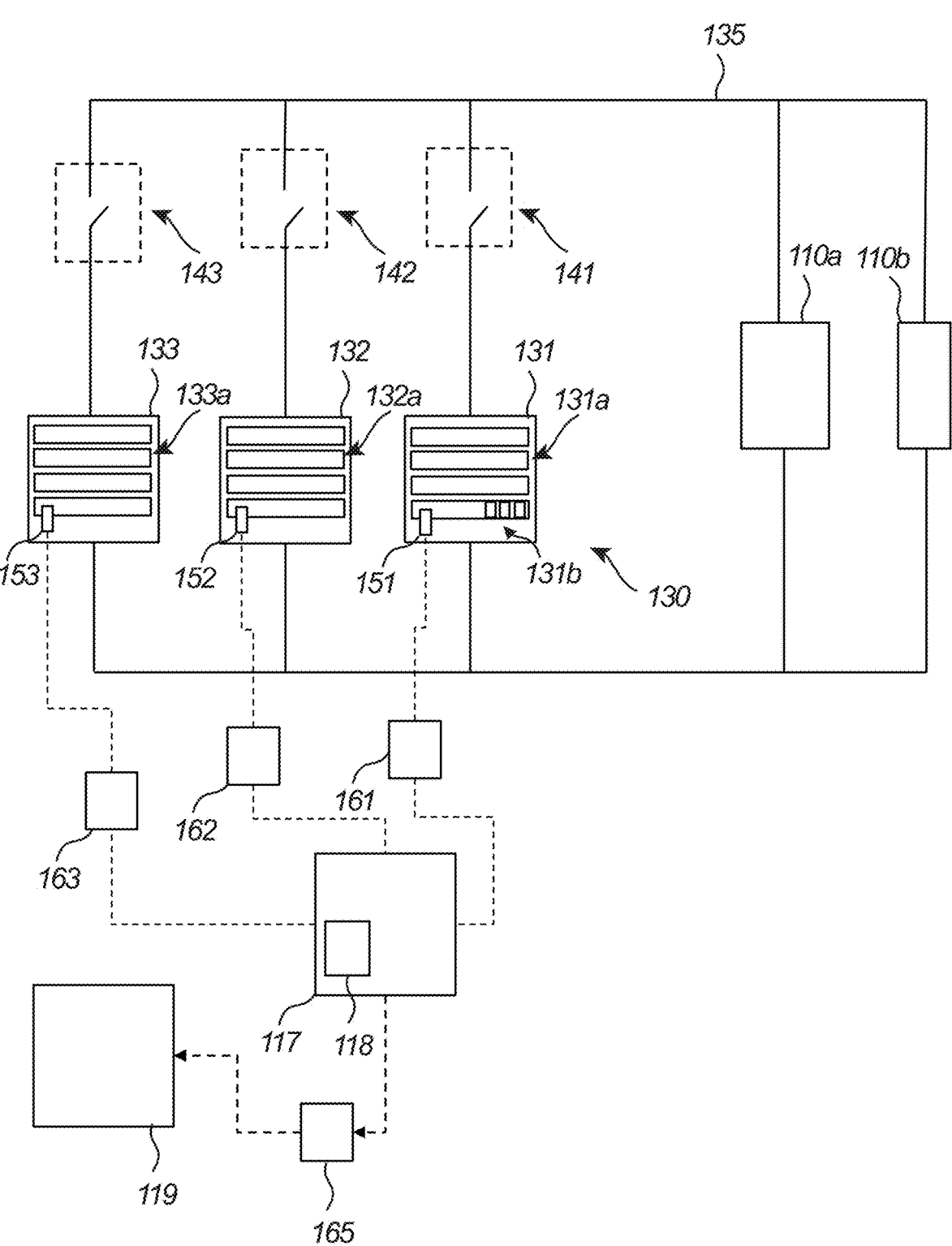
FIG. 2 is a schematic view of an energy storage system of a vehicle, the energy storage system having a plurality of parallelly arranged battery packs and a computer system according to one example.

FIG. 2 is a schematic view of an energy storage system 130 having a plurality of parallelly connected battery packs 131, 132, 133, and a computer system 117 comprising processing circuitry 118. The example shown in FIG. 2 may be implemented in the vehicle 1 of FIG. 1. The plurality of battery packs 131, 132, 133 is arranged in parallel for connection to a common traction voltage bus 135 and powering of a plurality of loads 110a, 110b (e.g. one of the loads 110b being an electric machine, e.g. as electric machine 10 of FIG. 1). The energy storage system 130 comprises a plurality of contactors 141, 142, 143 (e.g. comprised in a switching arrangement) configured to connect and disconnect the battery packs 131, 132, 133 to and from the common traction voltage bus 135. The common traction voltage bus 135 may in some examples be comprised in a junction box.

Each one of the battery packs 131, 132, 133 typically comprises a plurality of series-connected battery cells 131b, only indicated for the first battery pack 131. The battery cells may be clustered into battery modules 131a, 132a, 133a, wherein each battery pack 131, 132, 133 comprises a plurality of series-connected battery modules. The battery cells in a battery module may be series-connected and/or be parallelly connected. The energy storage system 130 may be referred to as a multi-battery pack system.

In more detail, the energy storage system 130 comprises a first battery pack 131, a second battery pack 132 and a third battery pack 133, but it should be noted that any number of battery packs equal to, or higher than, two may be included in the energy storage system 130. The energy storage system 130 comprises an associated contactor 141, 142, 143 for each battery pack 131, 132, 133. Thus, a first contactor 141 is configured to connect and disconnect the first battery pack 131 to and from the common traction voltage bus 135 by closing and opening, respectively, and a second contactor 142 is configured to connect and disconnect the second battery pack 132 to and from the common traction voltage bus 135 by closing and opening, respectively, and a third contactor 143 is configured to connect and disconnect the third battery pack 133 to and from the common traction voltage bus 135 by closing and opening, respectively. Thus, an associated contactor, here being the first, second and third contactors 141, 142, 143, is provided for each battery pack, here being the corresponding first, second and third battery packs 131, 132, 133. The plurality of loads 110a, 110b may be powered by all, some, or any one, of the first, second and third battery packs 131, 132, 133 by closing the corresponding first, second and third contactors 141, 142, 143, i.e. by connecting the first, second and third battery packs 131, 132, 133 to the common traction voltage bus 135.

Any one of, some, or all of, the first, second and third battery packs 131, 132, 133 may be disconnected from the common traction power bus 135 by opening the corresponding first, second and third contactors 141, 142, 143. The computer system 117, or processing circuitry 118, is configured to control at least part of the operation of the contactors 141, 142, 143, and thus the opening and closing of the first, second and third contactors 141, 142, 143. The contactors 141, 142, 143 are, via the computer system 117, configured to disconnect the first, second and third battery packs 131, 132, 133 from the common traction voltage bus 135 by means of the first, second and third contactors 141, 142, 143, respectively. The energy storage system 130 may comprise additional contactors (e.g. pre-charge contactors, secondary contactors) for one or more of the battery packs 131, 132, 133.

The energy storage system 130 of FIG. 2 comprises a plurality of sensors configured to measure the voltage in each one of the battery packs 131, 132, 133. In more detail, a first voltage sensor 151 is configured to measure a voltage in the first battery pack 131 and to send sensor data 161 of the voltage measurement to the processing circuitry 118 of the computer system 117, a second voltage sensor 152 is configured to measure a voltage in the second battery pack 132 and to send sensor data 162 of the voltage measurement to the processing circuitry 118 of the computer system 117, and a third voltage sensor 153 is configured to measure a voltage in the third battery pack 133 and to send sensor data 163 of the voltage measurement to the processing circuitry 118 of the computer system 117. As shown in FIG. 2, each one of the first, second and third voltage sensor 151, 152, 153 is arranged to measure the voltage of a corresponding battery cell, or group of battery cells, in an associated battery module 131, 132a, 133a of the battery pack 131, 132, 133. Each one of the first, second and third voltage sensors 151, 152, 153 is schematically shown in FIG. 2. Such voltage sensors are typically arranged to measure the voltage in the corresponding battery pack 131, 132, 133. However, it should be mentioned that the sensors may be current sensors, or another type of sensor, which determine the voltage based on measurements of the current in the corresponding battery pack 131, 132, 133 using applicable empirical laws, such as e.g. Ohm's law. Thus, as such determined voltage is based on measurements (current, resistance, etcetera), it may still be referred to as determined measured voltage. Also, it should be noted that one of more of the first, second and third voltage sensors 151, 152, 153 may be a combined current and voltage sensor. The computer system 117 and the processing circuitry 118 is configured to receive the sensor data 161, 162, 163, or measured voltage, from the voltage sensors 151, 152, 153. It should be noted that at least parts of the computer system 117 may be located outside the vehicle 1, and/or be distributed inside the battery packs 131, 132, 133.

Figure 3:
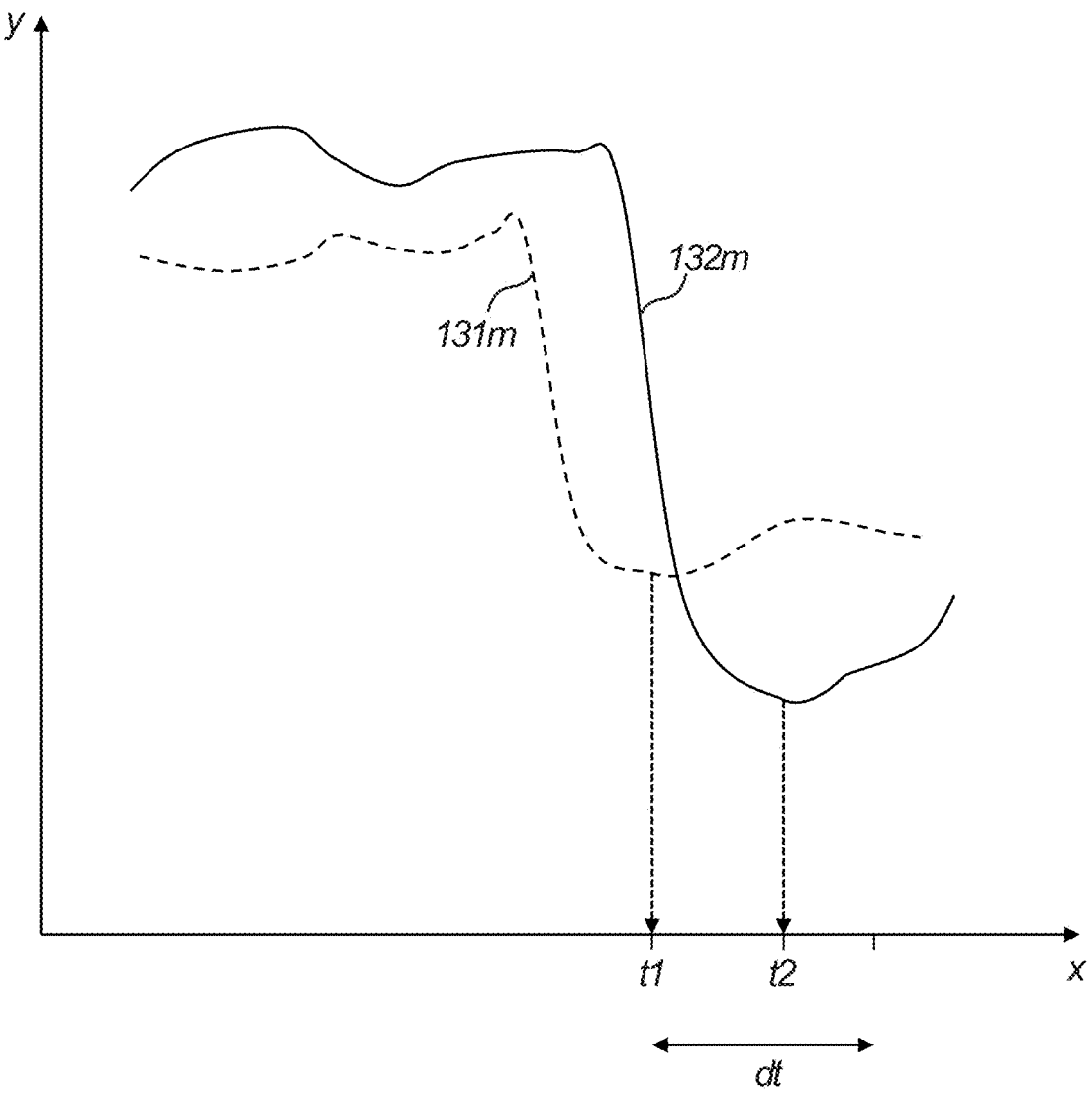
FIG. 3 is a graph showing voltage measurements of a first battery pack and a second battery pack over time according to one example.

With additional reference to FIG. 3, showing graph of voltage (y-axis) as a function of time (x-axis). The graph show a first voltage measurement 131m related to the first battery pack 131 and a second voltage measurement 132m related to the second battery pack 132 over time. The following description is mainly related to the first and second battery packs 131, 132, but it should be understood that a corresponding implementation can be made for the first and third battery packs 131, 133, the second and third battery packs 132, 133, or for all of the first, second and third battery packs 131, 132, 133. The processing circuitry 118 is configured to identify a fault or error from the first voltage measurement 131m at a first point in time t1 and during a first time interval dt. In the graph of FIG. 3, the fault or error from the first voltage measurement 131m is indicated as a sudden drop of measured voltage. The identified fault or error from the first voltage measurement 131m may be indicative of a disconnection of the first battery pack 131. Thus, the processing circuitry may be configured to disconnect the first battery pack 131, such as immediately disconnect the first battery pack 131, from the common traction voltage bus 135, e.g. by opening the first contactor 141, in response of identifying the fault or error from the first voltage measurement 131*m*. However, as will be described in the following, such disconnection of the first battery pack 131 may not occur.

Moreover, the processing circuitry 118 is configured to identify a fault or error from the second voltage measurement 132*m* at a second point in time t2. As shown in the graph of FIG. 3, fault or error from the second voltage measurement 132*m* is also stemming from a sudden drop of measured voltage. Thus, the fault or error from the first and second voltage measurements 131*m*, 132*m* are corresponding. Consequently, the identified fault or error from the second voltage measurement 132*m* may be indicative of a disconnection of the second battery pack 132. Therefore, it can be assumed that the corresponding faults or errors from the first and second voltage measurements 131*m*, 132*m* are originating from mis-triggered, or mis-interpretated, faults or errors, and not from authentic faults or errors in the first and second battery packs 131, 132. Consequently, the processing circuitry 118 is configured to, in response of identifying the corresponding faults or errors of the first and second voltage measurements 131*m*, 132*m*, i.e. the corresponding faults or errors in the voltage measurements in the first and second battery packs 131, 132 during the first time interval dt, prevent disconnection of at least the second battery pack 132. That is the second contactor 142 remains closed and the second battery pack 132 remains connected to the common traction voltage bus 135. Hereby, undesirable and unnecessary disconnections of at least the second battery pack 132 originating from mis-triggered, or mis-interpretated, faults or errors can be avoided, and the availability of the energy storage system 130 improved. The first time interval dt may e.g. extend from the first point in time t1 (and including the first point in time t1) and for a subsequent 5 s or 10 s. The processing circuitry 118 may e.g. be configured to prevent disconnection of the second battery pack 132 by transmitting data 165 with instruction to a control unit 119 for the second battery pack 132 to block disconnection of the second battery pack 132, or by simply omitting to transmit a decision to the control unit 119 to disconnect the second battery pack 132.

The processing circuitry 118 may be further configured to, in response of identifying the corresponding faults or errors of the first and second voltage measurements 131*m*, 132*m* during the first time interval dt, prevent disconnection of the first battery pack 131. That is, also the first contactor 141 may remain closed and the first battery pack 131 remained connected to the common traction voltage bus 135. Thus, in case the first battery pack 131 hasn't yet been disconnected as described above, e.g. due to an insufficient time subsequent to the identified fault or error of the first voltage measurement 131*m* for the processing circuitry 118 to manage such disconnection (e.g. to open the first contactor 141), the first battery pack 131 may be prevented to be disconnected from the common traction voltage bus 135 in response of identifying the corresponding faults or errors of the first and second voltage measurements 131*m*, 132*m* during the first time interval dt. Hereby, the availability of the energy storage system 130 may be further improved. For example, the processing circuitry 118 may be configured to, in response of identifying the fault or error of the first voltage measurement 131*m*, prevent disconnection of the first battery pack 131 at least during the first time interval dt. Thus, by implementing a lag for disconnecting the first battery pack 131 in response of identifying the fault or error of the first voltage measurement 131*m* at the first point in time t1, the lag being set to be at least that of the first time interval dt, disconnection of the first battery pack 131 may be prolonged in order to assess whether or not a corresponding fault or error will be identified for the second voltage measurement 132*m* during the first time interval dt. If such corresponding fault or error is identified for the second voltage measurement 132*m* during the first time interval, a likely unnecessary disconnection of the first battery pack 131 is avoided.

The corresponding faults or errors from the first and second voltage measurements 131*m*, 132*m* may be sensor faults or sensor errors from the corresponding voltage sensors 151, 152, 153. Thus, the processing circuitry 118 may be configured to identify the fault or error from the first voltage measurement 131*m* by receiving sensor data 161 from the first voltage sensor 151, the sensor data 161 including data of the fault or error. Moreover, the processing circuitry 118 may be configured to identify the fault or error from the second voltage measurement 132*m* by receiving sensor data 162 from the second voltage sensor 152, the sensor data 162 including data of the fault or error. Thus, the sensor data 161 of the first voltage measurement 131*m* may be compared to the sensor data 162 of the second voltage measurement 132*m*, and corresponding faults or errors of the voltage measurements in the first and second battery packs 131, 132 can be identified by the compared sensor data.

Alternatively, the processing circuitry 118 may be configured to identify the faults or errors from the first and second voltage measurements 131*m*, 132*m* by identifying a lack of expected sensor data 161 from the first voltage sensor 151 in the first battery pack 131, and by identifying a lack of expected sensor data 162 from the second voltage sensor 152. Thus, by identifying or acknowledging no received sensor data in response to a requested first voltage measurement, and identifying or acknowledging no received sensor data in response to a requested second voltage measurement, the processing circuitry 118 may be configured to determine corresponding faults or errors of the first and second voltage measurements 131*m*, 132*m* are present.

Figure 4:
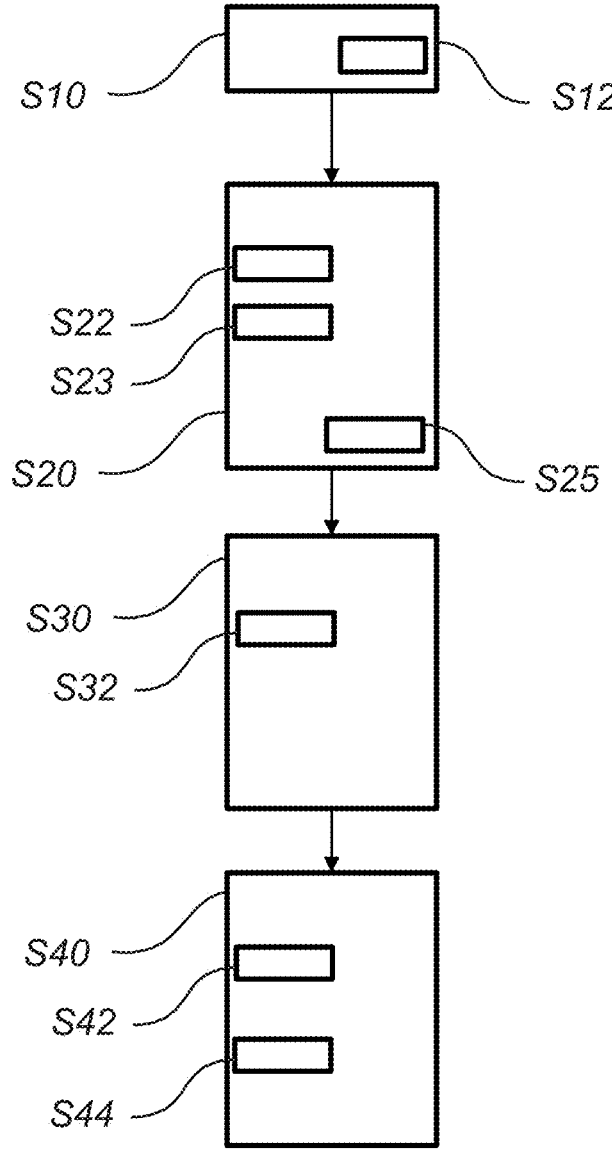
FIG. 4 is a flowchart illustrating the actions or steps of a method according to one example.

FIG. 4 is a flow chart of a computer-implemented method for controlling prevention of disconnecting a battery pack in an energy storage system of a vehicle, such as at least the second battery pack 132 of the energy storage system 130 of FIG. 2.

In a first action or step, S10, a fault or error from a voltage measurement in a first battery pack of an energy storage system is identified, by a processing circuitry of a computer system, at a first point in time and during a first time interval. The first action or step S10 may comprise receiving S12, by the processor circuitry, sensor data from a voltage or current sensor in the first battery pack, the sensor data including the fault or error data.

In a second action or step, S20, a corresponding fault or error from a voltage measurement in a second battery pack of the energy storage system is identified, by the processing circuitry, at a second point in time and during the first time interval, the second point in time being subsequent to the first point in time. The second action or step S20 may comprise receiving S22, by the processor circuitry, sensor data from a voltage or current sensor in the second battery pack, the sensor data including the fault or error data. The first time interval may e.g. extend from the first point in time for a subsequent 5 s or 10 s. The second action or step S20 may comprise identifying the fault or error from the voltage measurement in the first battery pack by identifying S23, by the processing circuitry, a lack of expected sensor data from a voltage sensor in the first battery pack; and identifying the fault or error from the voltage measurement in the second battery pack by identifying S25, by the processing circuitry, a lack of expected sensor data from a voltage sensor in the second battery pack.

Thus, the energy storage system comprises at least two parallelly arranged battery packs, the battery packs typically being connectable to a common traction voltage bus and/or a load by a corresponding contactor, as shown in FIG. 2. Thus, the contactors are configured connect and disconnect the associated battery pack to and from the common traction voltage bus and/or the load by closing and opening, respectively. The closing and opening of the contactors are typically controlled by the processing circuitry.

In a third action or step, S30, at least the second battery pack is prevented, by the processing circuitry, from being discontented in response of identifying the corresponding faults or errors of the voltage measurements in the first and second battery packs during the first time interval. Hereby, undesirable and unnecessary disconnections of at least the second battery pack originating from mis-triggered, or mis-interpretated, faults or errors can be avoided, and the availability of the energy storage system improved. The third action or step, S30, may comprise transmitting S32, by the processing circuitry, data with instruction to a control unit for the second battery pack to block disconnection of the second battery pack In a fourth action or step, S40, which may occur prior to, subsequently, simultaneously with the third action or step S30, the first battery pack is prevented, by the processing circuitry, from being disconnected in response of identifying the corresponding faults or errors of the voltage measurements in the first and second battery packs during the first time interval. The fourth action or step, S40, may comprise preventing disconnection S42, by the processing circuitry, of the first battery pack at least during the first time interval in response of identifying the fault or error of the voltage measurement in the first battery pack. For example, disconnection of the first battery pack may be prevented during the first time interval. The fourth action or step, 40, may comprise transmitting S44, by the processing circuitry, data with instruction to a control unit for the first battery pack to block disconnection of the first battery pack.

Figure 5:
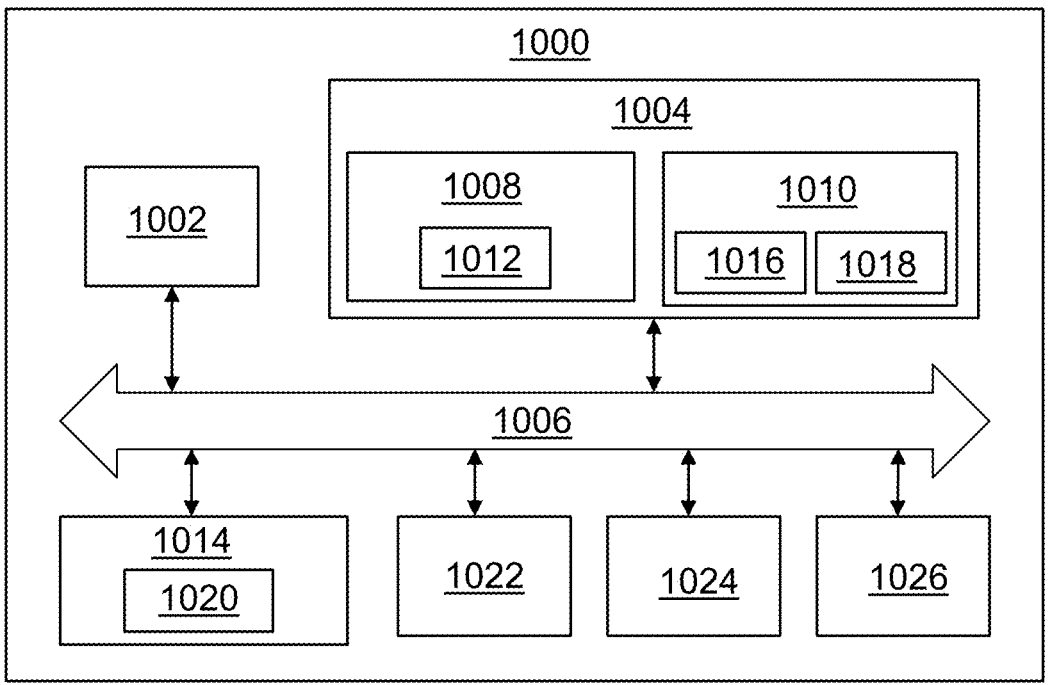
FIG. 5 is a schematic diagram of an exemplary computer system for implementing examples disclosed herein, according to one example.

FIG. 5 is a schematic diagram of a computer system 1000 for implementing examples disclosed herein, e.g. the method as described with reference to FIG. 3. The computer system 1000 may be implemented in the computer system 17 of FIG. 1 or computer system 117 of FIG. 2. The computer system 1000 is adapted to execute instructions from a computer-readable medium to perform these and/or any of the functions or processing described herein. The computer system 1000 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include a processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with a processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1. A computer system comprising processing circuitry configured to: identify a fault or error from a voltage measurement in a first battery pack of an energy storage system at a first point in time and during a first time interval; identify a corresponding fault or error from a voltage measurement in a second battery pack of the energy storage system at a second point in time and during the first time interval, the second point in time being subsequent to the first point in time; in response of identifying the corresponding faults or errors of the voltage measurements in the first and second battery packs during the first time interval, prevent disconnection of at least the second battery pack.

Example 2. The computer system of example 1, wherein the processing circuitry is further configured to: in response of identifying the corresponding faults or errors of the voltage measurements in the first and second battery packs during the first time interval, prevent disconnection of the first battery pack.

Example 3. The computer system of any of examples 1-2, wherein the processing circuitry is further configured to: in response of identifying the fault or error of the voltage measurement in the first battery pack, prevent disconnection of the first battery pack at least during the first time interval.

Example 4. The computer system of any of examples 1-3, wherein the first time interval is shorter than 10 s, or shorter than 5 s.

Example 5. The computer system of any of examples 1-4, wherein the corresponding faults or errors from the voltage measurements in the first and second battery packs are sensor faults or sensor errors from corresponding voltage or current sensors in the first and second battery packs.

Example 6. The computer system of any of examples 1-5, wherein the processing circuitry is further configured to: prevent disconnection of the second battery pack by transmitting data with instruction to a control unit for the second battery pack to block disconnection of the second battery pack.

Example 7. The computer system of any of examples 1-6, wherein the corresponding faults or errors from the voltage measurements in the first and second battery packs are indicative of a disconnection of the first and second battery packs, respectively.

Example 8. The computer system of any of examples 1-7, wherein the processing circuitry is configured to identify the fault or error from the voltage measurement in the first battery pack by receiving sensor data from a voltage or current sensor in the first battery pack, the sensor data including data of the fault or error, and to identify the fault or error from the voltage measurement in the second battery pack by receiving sensor data from a voltage or current sensor in the second battery pack, the sensor data including data of the fault or error.

Example 9. The computer system of any of examples 1-7, wherein the processing circuitry is configured to identify the fault or error from the voltage measurement in the first battery pack by identifying a lack of expected sensor data from a voltage or current sensor in the first battery pack, and to identify the fault or error from the voltage measurement in the second battery pack by identifying a lack of expected sensor data from a voltage or current sensor in the second battery pack.

Example 10. A vehicle comprising the computer system of any of examples 1-9.

Example 11. The vehicle of example 10, further comprising a first voltage or current sensor arranged in the first battery pack of the energy storage system, the first voltage or current sensor being arranged to measure a voltage in the first battery pack and to send sensor data of the voltage measurement to the processing circuitry of the computer system, and a second voltage sensor arranged in the second battery pack of the energy storage system, the second voltage sensor being arranged to measure a voltage in the second battery pack and to send sensor data of the voltage measurement to the processing circuitry of the computer system.

Example 12. A computer-implemented method, comprising: identifying, by a processing circuitry of a computer system, a fault or error from a voltage measurement in a first battery pack of an energy storage system at a first point in time and during a first time interval; identifying, by the processing circuitry, a corresponding fault or error from a voltage measurement in a second battery pack of the energy storage system at a second point in time and during the first time interval, the second point in time being subsequent to the first point in time; preventing, by the processing circuitry, disconnection of at least the second battery pack in response of identifying the corresponding faults or errors of the voltage measurements in the first and second battery packs during the first time interval.

Example 13. The method of example 12, further comprising: preventing disconnection, by the processing circuitry, of the first battery pack in response of identifying the corresponding faults or errors of the voltage measurements in the first and second battery packs during the first time interval.

Example 14. The method of any of examples 12-13, further comprising: preventing, by the processing circuitry, disconnection of the first battery pack at least during the first time interval in response of identifying the fault or error of the voltage measurement in the first battery pack.

Example 15. The method of example any of examples 12-14, wherein the first time interval is shorter than 10 s, or shorter than 5 s.

Example 16. The method of example any of examples 12-15, further comprising: preventing disconnection of the second battery pack by transmitting, by the processing circuitry, data with instruction to a control unit for the second battery pack to block disconnection of the second battery pack.

Example 17. The method of any of examples 12-16, further comprising: identifying the fault or error from the voltage measurement in the first battery pack by receiving, by the processing circuitry, sensor data from a voltage or current sensor in the first battery pack, the sensor data including the fault or error data; and identifying the fault or error from the voltage measurement in the second battery pack by receiving, by the processing circuitry, sensor data from a voltage or current sensor in the second battery pack, the sensor data including the fault or error data.

Example 18. The method of any of examples 12-16, further comprising: identifying the fault or error from the voltage measurement in the first battery pack by identifying, by the processing circuitry, a lack of expected sensor data from a voltage sensor in the first battery pack; and identifying the fault or error from the voltage measurement in the second battery pack by identifying, by the processing circuitry, a lack of expected sensor data from a voltage sensor in the second battery pack.

Example 19. A computer program product comprising program code for performing, when executed by the processing circuitry, the method of any of examples 12-18.

Example 20. A non-transitory computer-readable storage medium comprising instructions, which when executed by the processing circuitry, cause the processing circuitry to perform the method of any of examples 12-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:
   identify a fault or error from a voltage measurement in a first battery pack of an energy storage system at a first point in time and during a first time interval,
   identify a corresponding fault or error from a voltage measurement in a second battery pack of the energy storage system at a second point in time and during the first time interval, the second point in time being subsequent to the first point in time,
   in response of identifying the corresponding faults or errors of the voltage measurements in the first and second battery packs during the first time interval, prevent disconnection of at least the second battery pack.

2. The computer system of claim 1, wherein the processing circuitry is further configured to: in response of identifying the corresponding faults or errors of the voltage measurements in the first and second battery packs during the first time interval, prevent disconnection of the first battery pack.

3. The computer system of claim 1, wherein the processing circuitry is further configured to: in response of identifying the fault or error of the voltage measurement in the first battery pack, prevent disconnection of the first battery pack at least during the first time interval.

4. The computer system of claim 1, wherein the first time interval is shorter than 10 s, or shorter than 5 s.

5. The computer system of claim 1, wherein the corresponding faults or errors from the voltage measurements in the first and second battery packs are sensor faults or sensor errors from corresponding voltage or current sensors in the first and second battery packs.

6. The computer system of claim 1, wherein the processing circuitry is further configured to: prevent disconnection of the second battery pack by transmitting data with instruction to a control unit for the second battery pack to block disconnection of the second battery pack.

7. The computer system of claim 1, wherein the corresponding faults or errors from the voltage measurements in the first and second battery packs are indicative of a disconnection of the first and second battery packs, respectively.

8. The computer system of claim 1, wherein the processing circuitry is configured to identify the fault or error from the voltage measurement in the first battery pack by receiving sensor data from a voltage or current sensor in the first battery pack, the sensor data including data of the fault or error, and to identify the fault or error from the voltage measurement in the second battery pack by receiving sensor data from a voltage or current sensor in the second battery pack, the sensor data including data of the fault or error.

9. The computer system of claim 1, wherein the processing circuitry is configured to identify the fault or error from the voltage measurement in the first battery pack by identifying a lack of expected sensor data from a voltage or current sensor in the first battery pack, and to identify the fault or error from the voltage measurement in the second battery pack by identifying a lack of expected sensor data from a voltage or current sensor in the second battery pack.

10. A vehicle comprising the computer system of claim 1.

11. The vehicle of claim 10, further comprising a first voltage or current sensor arranged in the first battery pack of the energy storage system, the first voltage or current sensor being arranged to measure a voltage in the first battery pack and to send sensor data of the voltage measurement to the processing circuitry of the computer system, and a second voltage sensor arranged in the second battery pack of the energy storage system, the second voltage sensor being arranged to measure a voltage in the second battery pack and to send sensor data of the voltage measurement to the processing circuitry of the computer system.

12. A computer-implemented method, comprising:

identifying, by a processing circuitry of a computer system, a fault or error from a voltage measurement in a first battery pack of an energy storage system at a first point in time and during a first time interval, identifying, by the processing circuitry, a corresponding fault or error from a voltage measurement in a second battery pack of the energy storage system at a second point in time and during the first time interval, the second point in time being subsequent to the first point in time, preventing, by the processing circuitry, disconnection of at least the second battery pack in response of identifying the corresponding faults or errors of the voltage measurements in the first and second battery packs during the first time interval.

13. The method of claim 12, further comprising: preventing disconnection, by the processing circuitry, of the first battery pack in response of identifying the corresponding faults or errors of the voltage measurements in the first and second battery packs during the first time interval.

14. The method of claim 12, further comprising: preventing, by the processing circuitry, disconnection of the first battery pack at least during the first time interval in response of identifying the fault or error of the voltage measurement in the first battery pack.

15. The method of claim 12, wherein the first time interval is shorter than 10 s, or shorter than 5 s.

16. The method of claim 12, further comprising: preventing disconnection of the second battery pack by transmitting, by the processing circuitry, data with instruction to a control unit for the second battery pack to block disconnection of the second battery pack.

17. The method of claim 12, further comprising: identifying the fault or error from the voltage measurement in the first battery pack by receiving, by the processing circuitry, sensor data from a voltage or current sensor in the first battery pack, the sensor data including the fault or error data; and identifying the fault or error from the voltage measurement in the second battery pack by receiving, by the processing circuitry, sensor data from a voltage or current sensor in the second battery pack, the sensor data including the fault or error data.

18. The method of claim 12, further comprising: identifying the fault or error from the voltage measurement in the first battery pack by identifying, by the processing circuitry, a lack of expected sensor data from a voltage sensor in the first battery pack; and identifying the fault or error from the voltage measurement in the second battery pack by identifying, by the processing circuitry, a lack of expected sensor data from a voltage sensor in the second battery pack.

19. A non-transitory computer-readable storage medium comprising instructions, which when executed by the processing circuitry, cause the processing circuitry to perform the method of claim 12.

* * * * *